United States Patent
Boulos et al.

(10) Patent No.: US 6,408,650 B1
(45) Date of Patent: Jun. 25, 2002

(54) NITRATE/NITRITE-FREE MANUFACTURING OF GLASS WITH SELENIUM

(75) Inventors: Edward Nashed Boulos, Troy, MI (US); James Victor Jones, Toledo, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 08/988,481

(22) Filed: Dec. 10, 1997

(51) Int. Cl.$^7$ .................................................. C03B 5/16
(52) U.S. Cl. ..................... 65/134.3; 65/30.1; 65/30.11; 65/99.2; 501/70; 501/71; 501/904; 501/905
(58) Field of Search ............................ 501/70, 71, 904, 501/905; 65/134.3, 30.1, 30.11, 99.2

(56) References Cited

U.S. PATENT DOCUMENTS

| | | |
|---|---|---|
| 2,955,948 A | 10/1960 | Silverman |
| 3,296,004 A | 1/1967 | Duncan |
| 4,101,705 A | 7/1978 | Fischer et al. |
| 4,104,076 A | 8/1978 | Pons |
| 4,190,452 A | 2/1980 | Fischer et al. |
| 4,339,541 A | 7/1982 | Dela Ruye |
| 4,341,566 A * | 7/1982 | Barrett et al. ................ 106/313 |
| 4,873,206 A | 10/1989 | Jones |
| 5,023,210 A | 6/1991 | Krumwiede et al. |
| 5,070,048 A | 12/1991 | Boulos et al. |
| 5,308,805 A | 5/1994 | Baker et al. |
| 5,346,867 A * | 9/1994 | Jones et al. .................... 501/71 |
| 5,411,922 A | 5/1995 | Jones |
| 5,521,128 A | 5/1996 | Jones et al. |
| 5,807,417 A * | 9/1998 | Boulos et al. .............. 65/134.3 |
| 5,851,940 A * | 12/1998 | Boulos et al. ................. 501/71 |

FOREIGN PATENT DOCUMENTS

| | | |
|---|---|---|
| WO | WO 98/25863 | 6/1998 |
| WO | WO 99/02461 | 1/1999 |

\* cited by examiner

*Primary Examiner*—Michael Colaianni
(74) *Attorney, Agent, or Firm*—Damian Porcari

(57) ABSTRACT

The invention is a method of retaining selenium in a lass containing selenium by including a manganese compound and not including nitrates or nitrites routinely used in the industry to retain selenium. Particularly, a preferred embodiment involves manufacturing a gray soda-lime-silica glass composition including selenium as a colorant, the components of the gray soda-lime-silica glass have colorants consisting essentially of: greater than 0.9 to 1.9 wt. % total iron oxide as $Fe_2O_3$; 0.10 to 1.00 wt. % manganese compound as $MnO_2$; 0.0010 to 0.0060 wt. % selenium as Se; 0.002 to 0.025 wt. % cobalt oxide as Co, and 0 to 1.0 wt. % titanium oxide as $TiO_2$ which are combined and melted to make the glass composition. The glass composition has at 4.0 mm. thickness: 10 to 55% light transmittance using Illuminant A, less than 25% ultra violet transmittance, and less than 50% infra red transmittance.

24 Claims, No Drawings

NITRATE/NITRITE-FREE MANUFACTURING OF GLASS WITH SELENIUM

The invention is directed to a method of manufacturing a glass composition which contains selenium with manganese compound for selenium retention and without the use of nitrate or nitrite. Preferably it includes a reductant like anthracite coal. The glass is a soda-lime-silica glass whose colorants consist essentially of iron oxide, selenium, manganese oxide, cobalt oxide, and optionally titanium oxide.

BACKGROUND OF THE INVENTION

Many patents including selenium as a colorant have included sodium nitrate or potassium nitrate in the batch mixture to help improve the retention of selenium in the final product or for other purposes. For example, U.S. Pat. Nos. 3,296,004; 4,101,705; 4,104,076; and 4,190,452 all disclose bronze glass compositions using selenium together with sodium or potassium nitrates as components of their batches. U.S. Pat. No. 4,104,076 also teaches adding selenium and nitrates to the batch to make a gray glass composition as well as a bronze glass composition. U.S. Pat. No. 5,070,048 teaches a blue colored glass product using selenium together with sodium nitrate in the batch mixture. U.S. Pat. Nos. 4,339,541; 4,873,206; 5,023,210; 5,308,805; 5,346,867; 5,411,922; and 5,521,128 are all patents which teach using sodium or potassium nitrate in the batch when selenium is used as a colorant to make gray glass products. Hence, as seen from the above, it is extremely common in the glass making industry to include nitrates when using selenium as a colorant.

The present inventors have disclosed in U.S. Pat. No. 5,346,867 (Jones '867) a gray glass whose colorants consist essentially of iron oxide, cobalt, selenium and manganese oxide and optionally titanium oxide, the manganese oxide providing selenium retention during processing. Batch materials disclosed therein include sodium and/or potassium nitrate to maintain oxidizing conditions early in the melting process which aids in selenium retention. The process for retarding volatilization of the selenium using a manganese containing compound along with the selenium during melt processing, which includes sodium nitrate as a batch component, is claimed in U.S. Pat. No. 5,521,128 (Jones et. al '128), a divisional of the '867 patent mentioned above.

One of the disadvantages of using nitrates or nitrites in batch processing is that they can generate environmentally undesirable nitrogen oxide emissions. In addition, we have found that when sodium nitrate is used in the batch, the amount of sodium sulfate (a fining agent) must be lowered which may adversely affect the fining action of sodium sulfate. Otherwise, the retention of selenium would be adversely impacted.

We have unexpectedly found that the manganese compound, e.g., used in the gray glass of Jones '867 to retain selenium, also has sufficient oxidizing ability which allows nitrates and nitrites to be avoided throughout the manufacturing process of the selenium containing glass, contrary to what was formerly believed. This also allows the amount of sodium sulfate to be desirably increased over that which would normally be used when nitrates are included in the batch materials, which improves the fining action of the sulfates without negatively impacting the selenium retention. Hence, the present invention nitrate/nitrite-free manufacturing process provides a unique way to make a selenium containing glass, such as the '867 Jones et al. gray glass, in a more environmentally friendly way while retaining selenium retention and in a way that overcomes problems which might develop based on the impact of using nitrates with sulfates.

In U.S. patent application Ser. No. 08/691,958 filed Aug. 5, 1996 and entitled "Reduction of Nickel Sulfide Stones In Glass", also having common inventorship and ownership with the present invention, a method is disclosed which involves using a manganese compound to prevent the formation of nickel sulfide stones by encouraging an oxidizing environment in the glass melt.

SUMMARY OF THE INVENTION

The present invention is an improved method for manufacturing a selenium containing glass, such as the particular soda-lime-silica gray glass of 'Jones 867, without including nitrates or nitrites in the glass batch during molten glass formation. And while excluding nitrates/nitrites, the method is able to maintain selenium retention as with nitrates or nitrates commonly included therein.

One preferred method is directed to manufacturing the gray composition of '867 Jones which comprises by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: 0.9 to 1.9 wt. % total iron oxide as $Fe_2O_3$, 0.10 to 1.0 wt. % manganese oxide as $MnO_2$; 0.002 to 0.025 wt. % cobalt oxide as Co, and 0.0010 to 0.0060 wt. % selenium as Se, and 0 to 1.0 wt. % titanium oxide as $TiO_2$. The glass may also include tramp materials which sometimes enter the glass with raw materials or as a result of changeover of one glass composition to another in a glass furnace. For example, this would include up to about 0.005 wt. % nickel oxide as NiO.

The gray glass products made according to this preferred embodiment of the invention have the following spectral properties at 4.0 mm. thickness: 10 to 55% light transmittance using Illuminant A (LTA) and less than 25% ultra violet (UV) transmittance measured over the range of 280 to 400 nanometers and less than 50% infra red (IR) transmittance measured over the range of 720 to 2120 nanometers.

Further, this gray glass considered at a 4.0 mm. thickness preferably has the following spectral properties: 470–590 dominant wavelength and less than 5.5% purity of excitation.

The method comprises including a manganese compound while excluding nitrates or nitrites like sodium nitrate from the glass batch along with the selenium to retain selenium during melt processing. In order to maintain the same level of selenium retention with only manganese compound as would be retained with manganese compound and nitrate/nitrite, the level of manganese compound is increased in the batch components. That is, an amount of manganese compound needs to be added to replace the amount of nitrate/nitrate excluded. Excluding nitrates/nitrites from the manufacturing process of a glass composition which contains selenium while using manganese compound solely to retain selenium is contrary to what one would expect from the teachings in the patent literature.

Advantageously, we have unexpectedly found that the addition of a manganese compound alone, i.e., without any nitrate/nitrite compounds, to the glass batch to retain the selenium such as in the gray glass (Jones '867 and '128) is sufficient to retain the oxidizing conditions even at the beginning of melt processing so that no nitrates nor nitrites are necessary. That is, the manganese oxide acts in the glass batch to sufficiently shift the conditions of the glass batch toward oxidizing so that the selenium is retained without the use of the nitrates/nitrites, reducing undesirable nitrogen oxide emissions.

In addition, excluding nitrates/nitrites from batch processing of a glass containing selenium advantageously allows more sodium sulfate to be included in the melt for improved fining action in the glass batch during manufacturing.

DESCRIPTION OF PREFERRED EMBODIMENTS OF THE INVENTION

The invention is an improved way of manufacturing a glass containing selenium to retain selenium without the use of nitrates or nitrites. An example of such method will be explained herein with reference to a preferred embodiment method, i.e., based on an improved method of manufacturing the gray glass of U.S. Pat. No. 5,346,867 to Jones et al. disclosed above, which reference is hereby expressly incorporated by reference in this document for all of its teachings. However, this discussion of the improved method for retaining selenium based on the gray glass is meant to apply to other glasses containing selenium as well. This improved method thus involves manufacturing, according to a preferred embodiment, the '867 gray glass without any nitrates or nitrites commonly used in manufacturing glass having selenium as a colorant.

Since selenium is easily vaporized from a glass melt, as discussed above, many patents disclose that when selenium is included as a colorant, it was thought necessary to include nitrates or nitrites like sodium nitrate in the glass melt for retaining selenium. It was disclosed in the '867 and '128 patents that sodium and/or potassium nitrate are used in glass batches of the invention to maintain oxidizing conditions early in the melting process which aids in selenium retention. Manganese oxide was included to improve the selenium retention.

The gray glass made according to the preferred improved method is a soda-lime-silica glass, and is useful particularly in the automotive and architectural industries. It is conveniently made by the float glass process. The base glass composition of the gray glass and other glasses used in the automotive or architectural industry is generally characterized by the following composition shown in Table I, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The improved method of this invention is not limited, however, to such soda-lime-silica glasses or the particular gray soda-lime-silica glass discussed in detail herein (the '867 Jones et al. glass) as would be apparent to one skilled in the art in view of the present disclosure. Rather, the disclosed improved manufacturing method for retaining selenium may find use in the manufacture of any selenium containing glass to retain the selenium with manganese compounds and without the use of nitrates/nitrites. Generally, in forming such selenium containing glasses according to the present invention improved selenium retention method, raw material components would most generally comprise components like sand, soda ash, dolomite, limestone, salt cake, rouge (for iron oxide colorant), a manganese containing compound, and selenium compound. The amounts and the particular materials employed would depend, however, on the particular glass being produced and selection would be within the skill of one in the art in view of the present disclosure.

The gray glass composition manufactured by the improved method according to one preferred embodiment of the present invention without the use of nitrates/nitrites employs the basic soda-lime-silica glass composition of Table I wherein, additionally, CaO+MgO is 6 to 15% and $Na_2O+K_2O$ is 10 to 20%. In addition, the coloring components of the gray glass composition consist essentially of: 0.9 to 1.9 wt. % total iron oxide as $Fe_2O_3$, 0.10 to 1.0 wt. % manganese oxide as $MnO_2$; 0.002 to 0.025 wt. % cobalt oxide as Co, and 0.0010 to 0.0060 wt. % selenium as Se, and 0 to 1.0 wt. % titanium oxide as $TiO_2$. The glass may also include tramp materials which sometimes enter the glass with raw materials or as a result of changeover of one glass composition to another in a glass furnace. For example, this would include up to about 0.005 wt. % nickel oxide as NiO.

Gray glass products made according to embodiments of invention method have the following spectral properties at 4.0 mm. thickness: 10 to 55% light transmittance using Illuminant A (LTA) and less than 25% ultra violet (UV) transmittance measured over the range of 280 to 400 nanometers and less than 50% infra red (IR) transmittance measured over the range of 720 to 2120 nanometers. Further, the gray glass considered at a 4.0 mm. thickness preferably has the following spectral properties: 470–590 dominant wavelength and less than 5.5% purity of excitation.

As disclosed in the '867 patent, as it would be known in the art, melting and refining aids are routinely included in glass manufacture and may also be used herein. One refining aid generally used to remove bubbles from the glass is sodium sulfate which results in $SO_3$ in the glass. Preferably $SO_3$ is present in the glass composition at 0.10 to 0.30 wt. %, more preferably 0.14 to 0.25 wt. %.

In the improved nitrate/nitrite-free selenium retention method of the present invention, a manganese compound is included to retain selenium since it acts as an oxidizer and one form of manganese oxide absorbs in the same area as selenium colorant so that it can desirably be used to replace a portion of the selenium in providing the glass color, e.g., the gray color the Jones '867 glass. The manganese compound is essential to the present invention improved method to retain selenium without the use of nitrates or nitrites, and desirably as discussed above, since this colorant absorbs in the same area as selenium, is able to replace a portion of the selenium as colorant.

The manganese compound is employed in the invention method to provide in the glass an amount of 0.10 to 1.0 wt. % manganese oxide based on $MnO_2$, more preferably being 0.15 to 0.8 wt. %, most preferably being 0.15 or 0.20 to 0.60 $MnO_2$. This manganese compound colorant can be added to the batch glass components in a variety of forms, for example, but not limited to, $MnO_2$, $Mn_3O_4$, MnO, $MnCO_3$, $MnSO_4$, $MnF_2$, $MnCl_2$, etc. Preferably it is most desirable to use the manganese oxide or manganese carbonate compounds in the batch. As would be appreciated, a mixture of such compounds may also be employed. In the glass composition, this colorant is generally present in the $Mn_{+2}$ and $Mn^{+3}$ state, although it may additionally be present in other states such as $Mn^{+4}$. As discussed herein, selenium is expensive and easily volatilized from the glass melt. Manganese oxide is inexpensive and not subject to such volatility so that it is optimal as a colorant in the present gray glass composition.

The manganese colorant has oxidizing ability so that when it is added to a glass containing iron oxide, as contained in almost all glass, it is able to shift the redox equilibrium of the iron oxide toward its oxidized form, $Fe_2O_3$. As disclosed above, we have found that the use of the manganese oxide colorant, which additionally provides oxidizing benefits, allows the elimination of nitrates or nitrites, e.g., commonly used sodium nitrate, as a raw material component in the present invention manufacture of a glass, such as the gray glass. And still, selenium retention is essentially able to maintained as when nitrates/nitrites are included as discussed above. This was unexpected and highly commercially desirable. In general, when selenium is added to a batch as a colorant in prior teachings in the patent literature, sodium nitrate is included in an amount of 5 to 20 pounds per 1000 pounds of sand. One would expect based on calculations, that this amount of nitrate could generate from 2.28 to 9.12 pounds/hour of $NO_x$ emissions per ton of glass produced from a typical mixture of 60% batch and 40% cullet. These nitrogen oxide emissions are advantageously eliminated by the improved method of the present invention.

Manganese oxide when added to the glass batch materials as in the embodiment present gray glass invention replaces a portion of the selenium colorant and in the specified amounts retains the selenium by acting as an oxidizer. Generally, one skilled in the art of glass making would not when desiring an oxidizing environment as provided by manganese oxide in the gray embodiment glass also add a reducing agent such as anthracite coal. In the instant invention method, however, in the batch the oxidizing material is preferably combined with anthracite coal or other like reductants such as graphite, slag from coal fired furnaces, blast furnace slag, coke, or the carbonaceous materials. We have found that such preferred use of the anthracite coal enhances the decomposition of sodium sulfate into sulfur trioxide which improves the fining (removal of gaseous inclusions) of the glass batch. Releasing sulfur trioxide gas into the molten glass helps to coalesce other gases into the bubbles formed and the bubbles rise, expand and burst open at the glass surface releasing the gases therein. This process is well know in the glass industry as fining to improve the quality of the glass. In particular, adding a reductant (e.g., carbocite) to a reducing batch that contains sodium sulfate or calcium sulfate is known to cause the decomposition of the sulfate at lower furnace operating temperatures than without said reductant. We have unexpectedly discovered that during oxidizing batch processing, as in the particular embodiment gray glass discussed herein, that we could simultaneously add manganese oxide and a reductant to the batch and maintain the desired oxidizing conditions via the manganese oxide in the glass while the fining is improved with the addition of a reductant to the batch. In addition, adding the reductant preferably allows the manufacturing of glass to be carried out at lower temperatures which itself aids in selenium retention. Operating at lower furnace temperatures during melting of the components in the batch furnace also aids in nitrogen oxide reduction from the combustion of the heating gases. Thus several important commercial advantages are obtained by the improved present invention method during production of the glass.

The glass composition also includes selenium, in the case of the preferred gray glass in an amount from 0.0010 to 0.0060 wt. % as Se which is an essential ingredient for the gray color because selenium has a maximum absorption about 500 nanometers and also combines with iron oxide to form an iron-selenium complex with a stronger absorption peak at about 490 nanometers. Manganese oxide in the $Mn^{+3}$ form also has an absorption peak about 490 nanometers so that manganese oxide can partially replace selenium in the composition and provide the absorption needed for the gray color of the glass. Selenium can be added to the glass in a variety of manners including: the elemental metal and in any compound form such as sodium selenite, barium selenite, selenium oxide, sodium selenate, etc.

The following table lists ingredients which are preferably used to form the gray glass compositions according to preferred embodiments of the present invention.

TABLE II

| BATCH MATERIALS | RANGE MASS (LBS.) |
| --- | --- |
| SAND | 1000 |
| SODA ASH | 290 TO 350 |
| DOLOMITE | 215 TO 260 |
| LIMESTONE | 70 TO 90 |
| SALT CAKE | 6 TO 24 |
| ROUGE (97% $Fe_2O_3$) | 12 TO 26 |
| TITANIUM DIOXIDE | 0 TO 7.0 |
| MANGANESE DIOXIDE | 1.3 TO 13 |
| COBALT OXIDE ($Co_3O_4$) | 0.25 TO 0.36 |
| SELENIUM | 0.20 TO 0.70 |
| CARBOCITE (70% C) | 0 TO 1.5 |
| NEPHELINE SYENITE | 0 TO 150 |

The quantities of salt cake and carbocite in Table II represent the largest range that would be used in the batch. Preferably, the improved method for the gray glass uses the following pounds of batch materials: salt cake and carbocite is 8–18 and 0.3–1.0 and most preferably are: 8–12 and 0.4–0.8, respectively per 1000 pounds of sand.

In order to demonstrate the advantages of the present invention for the preferred gray glass embodiment manufacturing method, glass was manufactured according to the teachings of patents '128 and '867 by the present inventors as in Example 9 thereof including sodium nitrate. As the run progressed, no further sodium nitrate was added, so that the sodium nitrate was removed from the glass of the batch entirely. Thus in our test, a drop in selenium retention was first observed, and then additional manganese oxide was added to compensate for the excluded nitrate, which improved the selenium retention to a level equivalent to or better than with the nitrates. In fact, when the manganese oxide was included in a level 25% by weight higher than the initial manganese oxide amount, it resulted in a slight improvement of selenium retention over that at the beginning of the run when using nitrates. Adding even more manganese compound is expected to improve the selenium retention even further, however, other consideration must be taken into account in the glass manufacture. For example, since including manganese oxide affects the redox ratio of $Fe^{+2}/Fe^{+3}$ which can affect the spectral properties, a balance of all of the properties of the glass is considered when selecting the optimal amount of manganese compound to be included for selenium retention as will be apparent to one skilled in the art in view of the present disclosure.

Hence, according to the present invention method, it was found that essentially no additional selenium was released to the furnace atmosphere as the nitrate was no longer added. Hence, selenium retention was maintained in the molten batch even without the use of sodium nitrate.

Measurements of $NO_x$ emissions were made during the times when the batch contained sodium nitrate and when the sodium nitrate was removed from the batch, and removing sodium nitrate from the batch led to a 15% reduction of $NO_x$ emissions in the furnace stack (believed due solely to nitrate use elimination in the glass batch).

In subsequent batch mixtures, anthracite coal (commercially called carbocite) was added to the batch as a preferred embodiment of the invention method which led to an improvement in lowering the number of "seeds" (minute undesirable gaseous inclusions) found in the final product due to improved fining of the molten glass. Thus, the present invention method lowered the potential for excess $NO_x$ emissions and improved the quality of the glass product.

Glass compositions including selenium, such as the preferred gray glass composition of Jones '867, made according in the present improved invention method can be used for automotive or architectural applications. They are generally made by floating the molten glass on a molten tin bath.

Although embodiment of the invention have been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

We claim:

1. A nitrate/nitrite-free method for retarding the volatilization of selenium used as a colorant in preparing a glass composition by including a manganese compound colorant along with the selenium without nitrate or nitrite compounds during the melt processing of the glass composition, the manganese compound being included to provide 0.1 to 1.0 wt. % manganese oxide as $MnO_2$ weight percent based on the total weight of the glass composition.

2. The method according to claim 1 which further comprises using during molten glass formation a reductant as a raw material component.

3. The method according to claim 2, wherein said reductant is selected from the group consisting of anthracite coal, blast furnace slag, slag from coal fired furnaces, coke, or graphite, or mixtures thereof.

4. The method according to claim 3 wherein said reductant comprises at least anthracite coal.

5. The method according to claim 3, wherein based on 1000 pounds of sand used to make said base glass composition, batch ingredients further comprise: 6–24 pounds sodium sulfate and 0–1.5 pounds carbocite.

6. The method according to claim 5, wherein based on 1000 pounds of said sand used to make said composition, the batch ingredients comprise: 8–18 pounds sodium sulfate and 0.3–1.0 pounds carbocite.

7. The method according to claim 6, wherein based on 1000 pounds of said sand used to make said composition, the batch ingredients: 8–12 pounds sodium sulfate and 0.4–0.8 pounds carbocite.

8. The method according to claim 1, wherein the amount of manganese compound in the gray glass composition expressed as $MnO_2$ is 0.15 to 0.8 wt. %.

9. The method according to claim 1, wherein the glass is a gray, bronze, or blue glass.

10. The method according to claim 9, wherein the dominant wavelength of the gray glass is between 470 and 590 nanometers.

11. The method according to claim 1 wherein the $SO_3$ is present in the glass composition in an amount between about 0.10 and 0.30 wt. %.

12. The method according to claim 1, wherein it further comprises floating molten glass made according to the method on a molten tin bath.

13. The method according to claim 1 wherein said the glass is architectural or automotive glass.

14. The method according to claim 8 wherein the amount of manganese compound in the glass composition expressed as $MnO_2$ is 0.15 to 0.60.

15. A nitrate/nitrite-free method for retarding the volatilization of selenium used as a colorant in preparing a gray glass composition by including a manganese containing compound along with the selenium without nitrate or nitrite compounds during melt process of the glass composition, said method comprising the steps of: admixing and melting together sand, soda ash, dolomite, limestone, salt cake, rouge, a manganese containing compound, a cobalt containing compound, and selenium, in quantities sufficient to form said gray glass composition having a base glass composition comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: 0.9 to 1.9 wt. % total iron oxide as $Fe_2O_3$, 0.1 to 1.0 wt. % manganese oxide as $MnO_2$; 0.002 to 0.025 wt. % cobalt oxide as Co, 0.0010 to 0.0060 wt. % selenium as Se, and 0 to 1.0 wt. % titanium dioxide as $TiO_2$ all by weight percent based on the total weight of the gray glass composition; the glass having at a 4.0 mm. thickness: 10 to 55% light transmittance using Illuminant A, less than 25% ultra violet transmittance, and less than 50% infra red transmittance.

16. The method according to claim 15 wherein based on 1000 pounds of said sand used to make said composition, the batch ingredients comprise: 6–24 pounds sodium sulfate and 0–1.5 pounds carbocite.

17. The method according to claim 16, wherein based on 1000 pounds of said sand used to make said composition, the batch ingredients comprise: 8–18 pounds sodium sulfate and 0.3–1.0 pounds carbocite.

18. The method according to claim 17, wherein based on 1000 pounds of said sand used to make said composition, the batch ingredients comprise: 8–12 pounds sodium sulfate and 0.4–0.8 pounds carbocite.

19. The method according to claim 15, wherein the amount of manganese compound in the gray glass composition expressed as $MnO_2$ is 0.15 to 0.8 wt. %.

20. The method according to claim 15, wherein the dominant wavelength of the gray glass is between 470 and 590 nanometers.

21. The method according to claim 15, wherein the $SO_3$ is present in the gray glass composition in an amount between about 0.10 and 0.30 wt. %.

22. The method according to claim 15, wherein it further comprises floating molten glass made according to the method on a molten tin bath.

23. The method according to claim 15, wherein said glass has less than 5.5% purity of excitation.

24. The method according to claim 19, wherein the amount of manganese compound in the gray glass composition expressed as $MnO_2$ is 0.15 to 0.60.

* * * * *

UNITED STATES PATENT AND TRADEMARK OFFICE
CERTIFICATE OF CORRECTION

PATENT NO. : 6,408,650 B1 Page 1 of 1
APPLICATION NO. : 08/988481
DATED : June 25, 2002
INVENTOR(S) : Boulos et al.

It is certified that error appears in the above-identified patent and that said Letters Patent is hereby corrected as shown below:

On the title page,
[*] delete "0" and insert --375--.

Signed and Sealed this

Second Day of January, 2007

JON W. DUDAS
*Director of the United States Patent and Trademark Office*